Feb. 4, 1958     E. C. MILLER     2,822,475

ANALYZER

Filed March 4, 1955     4 Sheets-Sheet 1

INVENTOR.
E. C. MILLER
BY
Hudson & Young
ATTORNEYS

Feb. 4, 1958  E. C. MILLER  2,822,475
ANALYZER
Filed March 4, 1955  4 Sheets-Sheet 2

INVENTOR.
E. C. MILLER
BY
Hudson & Young
ATTORNEYS

INVENTOR.
E. C. MILLER
BY Hudson & Young
ATTORNEYS

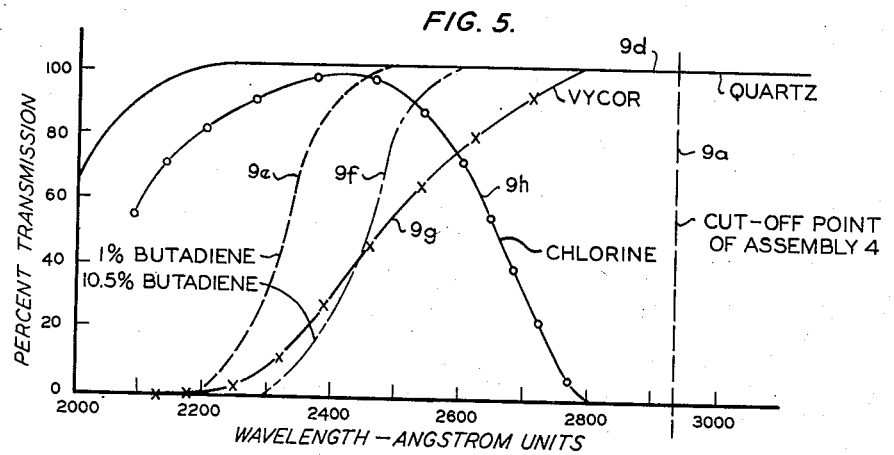
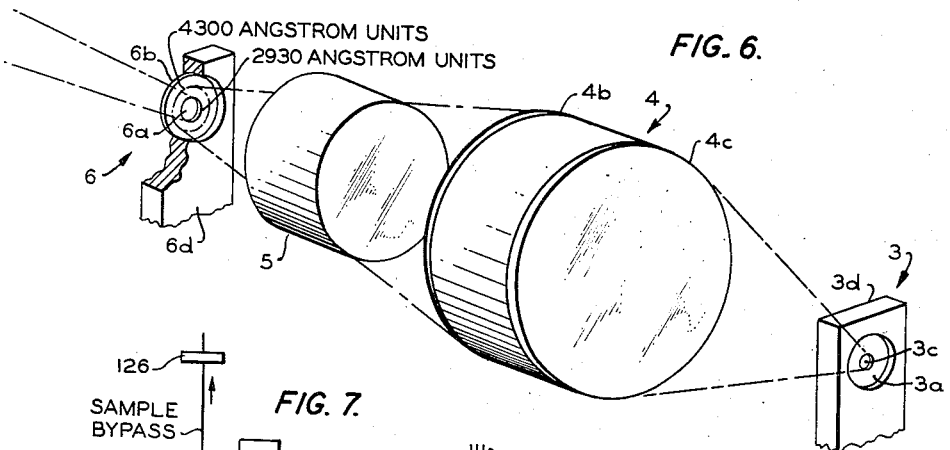
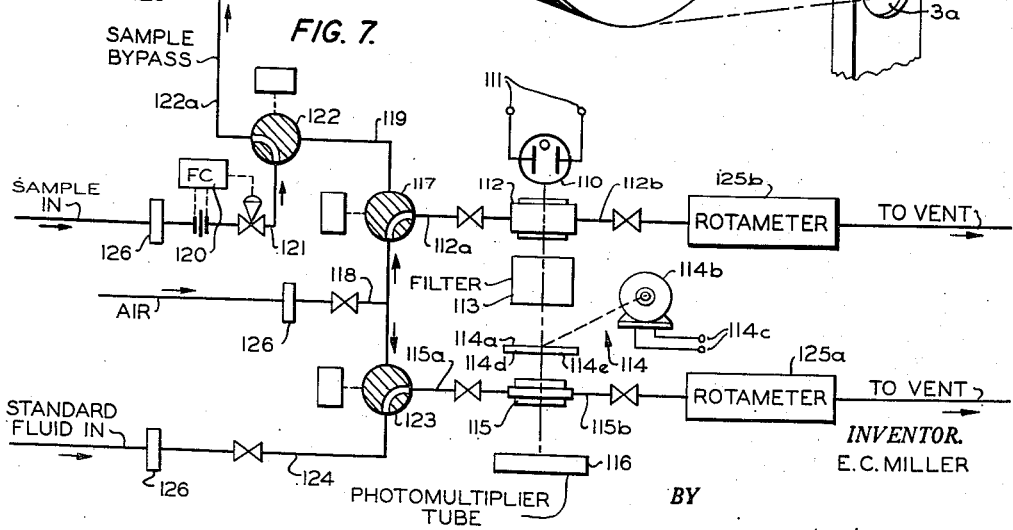

United States Patent Office 2,822,475
Patented Feb. 4, 1958

2,822,475

ANALYZER

Elmer C. Miller, Bartlesville, Okla., assignor to Phillips Petroleum Company, a corporation of Delaware Application March 4, 1955, Serial No. 492,114

13 Claims. (Cl. 250—43.5)

This invention relates to analyzers utilizing radiation. In another aspect, it relates to a novel filter arrangement for an ultraviolet analyzer. In still another aspect, it relates to a novel cell arrangement for analyzers utilizing radiation together with novel means for admitting and withdrawing sample fluids from the cells in the path of the radiation beam.

Heretofore, many types of analyzers have been devised, wherein a beam of radiation is passed through a sample of material to be analyzed, the intensity of the radiation beam, after passing through the sample material, being representative of the concentration of a selected component or group of components in the sample material. In such instruments, there is an optical system capable of passing the radiation beam through the sample material, and an electric circuit for indicating or recording the beam intensity after it has passed through the sample material. In such instruments, aging of the circuit components and optical components, variations in radiation intensity due, for example, to variations in applied voltage, and numerous other factors oftentimes contribute to cause "drift" of the instrument reading. That is, the output indicated by the instrument is affected by aging of components and variations in supply voltage in addition to the variations caused by changes in concentration of the sample material.

This undesirable condition can be remedied by providing automatic standardization of the instrument, wherein adjustments are periodically made to the circuit components to compensate and counterbalance the effects produced by aging of components, variations in supply voltage, and other factors causing drift. A suitable standardization system of this type is disclosed in Hutchins Patent 2,579,825.

In accordance with one aspect of this invention, a novel standardizing arrangement is provided where the component to be analyzed for has a relatively low concentration in the sample under analysis. During indicating cycles of the instrument, the sample is passed through a relatively long cell, and its composition is indicated by the instrument. During standardization cycles which alternate with the indicating cycles, a pure sample of the component being analyzed for is placed in the path of the radiation beam, and it is positioned in a cell which is much shorter than the sample cell. The electrical network to which the radiation detector unit is connected is then adjusted while the radiation beam passes through this sample of pure material to effect standardization of the instrument. Thus, the standardization is effected very accurately and advantageously because the radiation absorption of the fluid in the relatively short cell is approximately equal to that produced by the component of interest in the sample cell, which is relatively long.

It is a further feature and object of the invention to provide a novel filter arrangement for an ultraviolet analyzer wherein a "focal isolation" system is used to split up a beam of ultraviolet radiation so that a desired part of the spectrum can be selected for the analytical operation. In such an instrument, an optical system is provided which focuses different wavelengths of radiation at different points along the longitudinal axis of the optical system. By properly positioning an exit aperture along this axis, a desired band of ultraviolet radiation can be selected. It is evident that the aperture size and placement is very critical where these factors are the sole factors determining the cut off of the wavelength band to be employed. In accordance with the invention, I provide an auxiliary cell in the path of the beam which filters out a band of radiation including the frequency at which cut off is obtained by the action of the aperture assembly and yet retains the frequencies of interest in the particular analysis under consideration. In this manner, the placement and size of the aperture are much less critical, and the instrument is more reliable in operation and can be more readily adjusted. Where butadiene is the material to be analyzed for, chlorine is an effective material for use in this auxiliary cell to prescribe the described filtering action. Such filtering action can be advantageously provided either in connection with the two-cell standardization system previously described or in connection with a system where the sample and standard fluid flow alternately through a single cell.

It is a further feature and object of the invention to provide a sample and standardization fluid handling system which automatically regulates the passing of standardization and sample fluids to the cells and permits flushing out of the cells with air or any other non-absorbing fluid after each use thereof to provide improved analytical results.

Accordingly, it is an object of the invention to provide an improved cell construction and arrangement for analyzers utilizing radiation.

It is a further object to provide an improved filtering system particularly adaptable to ultraviolet or other analyzers utilizing the focal isolation principle.

It is a further object to provide an improved fluid-handling system for analyzers utilizing radiation.

It is a still further object to provide an instrument of the character described which is of low cost, reliable in operation, accurate in its analysis, and utilizes a minimum number of standard parts.

Various other objects, advantages and features of the invention will become apparent from the following detailed dscription taken in conjunction with the accompanying drawings, in which:

Figure 5 is a graph illustrating the operation of the filter system;

Figure 6 is a perspective view of a portion of the optical system; and

Figure 7 is a schematic view of a modified fluid-handling system.

Figure 2:
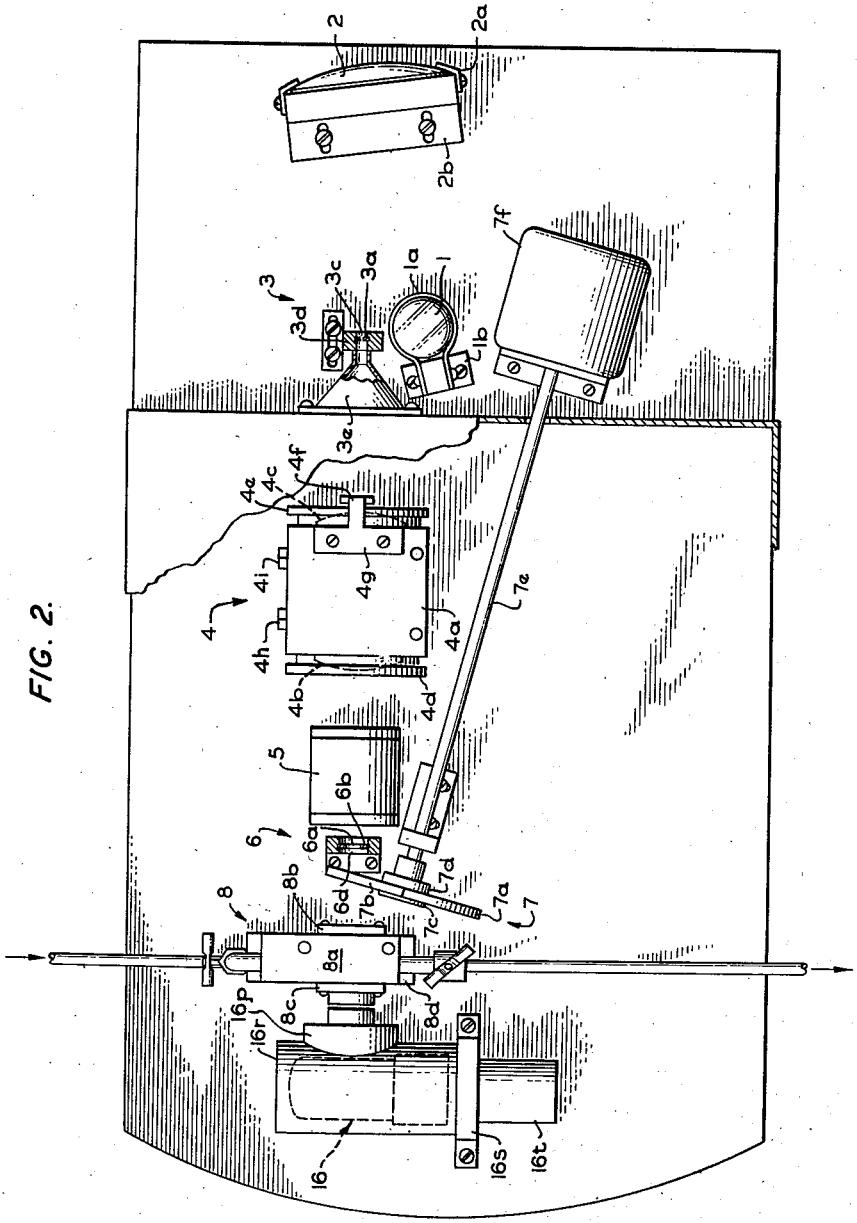
Figure 2 is an elevational view of an analyzer constructed in accordance with the invention.

Referring now to Figure 2, the instrument includes a radiation source 1, which can be a hydrogen lamp in the case of an ultraviolet analyzer, this lamp being mounted on a bracket 1a secured to a mounting fixture 1b.

Radiation from the source 1 is reflected by a mirror 2 secured by clips 2a to a bracket 2b, and the reflected radiation beam passes through a small aperture 3c in a disk 3a which is mounted on a support 3d carrying a frusto-conical radiation shield 3e. See Figure 6.

After passing through the aperture assembly 3, the radiation beam enters a focal isolation unit 4 including a lens holder 4a, and a pair of longitudinally-spaced lenses 4b, 4c, secured to the holder by lens caps 4d and 4e, respectively, a disk-shaped blocking member 4f being secured by a bracket 4g to the holder 4a to intercept or block out the central portion of the radiation beam and provide an annular beam impinging upon the lens 4c. As will become apparent hereafter, filter materials, standard fluid or sample fluid can in some cases be admitted to the interior of the lens holder and, for this purpose, there is provided an inlet fitting 4h and an outlet fitting 4i.

After leaving the focal isolation unit 4, the beam passes through a cell 5 containing a radiation-absorbing or filter material and, thence, through an aperture 6a formed in a disk 6b which is secured to a support 6d, this assembly constituting an exit aperture assembly 6.

After leaving the assembly 6, the beam passes through a chopper 7. This assembly includes a disk having a section 7a of material substantially transparent to the radiation under consideration and a section 7b composed of a filter material, this disk being secured by mounting members 7c and 7d to a shaft 7e which is driven by a motor 7f.

The chopped radiation beam leaving the assembly 6 passes through a cell 8a of an assembly 8. This cell is, in the example shown, adapted to be traversed alternately by sample fluid during an indicating cycle and by standard fluid, such as air, during a standardization cycle wherein electrical circuit components are adjusted to compensate for any effects caused by drift, resulting, for example, from aging of circuit or optical components, variations in radiation intensity and similar factors. The cell is provided with radiation transparent windows, not shown, held in place by caps 8b and 8c, the cell itself being mounted on a bracket 8d.

After traversing the material in the cell 8a, the radiation beam passes through a shield 16p and impinges upon a radiation-sensitive device 16. Where ultraviolet radiation is utilized, the device 16 can be a photomultiplier tube which is provided with a shield 16r, the tube and shield being secured to a support 16s which has attached at its lower end a cap 16t covering the resistances associated with the tube.

The operation of the described structure will be described in connection with the determination of the quantity of butadiene in a sample stream utilizing a focal isolation ultraviolet analyzer. In such case, the source 1 is a hydrogen lamp, the lenses 4b, 4c, the transparent windows of the cells 5 and 8a are all formed from quartz, the section 7b of the chopper disk is formed from Vycor, a glass manufactured by Corning Glass Works, Corning, New York, containing approximately 96 percent silicon dioxide and having ultraviolet transmission characteristics approximating those of butadiene, and the section 7a of the disk is formed from quartz. The cell 5 is filled with chlorine gas.

Assuming that the cell 8a contains a butadiene-containing sample to be analyzed, it will be noted that ultraviolet radiation passes from the source and mirror 2 through the slit assembly 3 to the focal isolation device 4. In this device, the quartz lenses exhibit a rapid change in refractive index with change in wavelength in the general region of 1800 to 3000 angstrom units. This change in refractive index with change in wavelength results in chromatic aberration of the lens such that radiation of different wavelengths is focused at different points along the longitudinal axis of the optical system proceeding downwardly from the assembly 4.

By properly adjusting the size of the aperture 6a and its axial position, certain wavelengths of ultraviolet radiation can be cut out. In the example shown, the aperture size and axial position are so adjusted that wavelengths longer than about 2900 to 3000 angstrom units are cut off, as indicated by the dashed line 9a, Figure 5. This is also illustrated in Figure 6 wherein it will be noted that wavelengths higher than 2900 to 3000 angstrom units, specifically 2930 angstrom units, are cut off because they cannot pass through the aperture 6a but, rather, are intercepted by the disk 6b. However, wavelengths shorter than 2900 to 3000 angstrom units pass readily through the aperture 6a. In Figure 5, the absorption characteristics of the quartz in the system are indicated by the solid line 9d.

After wavelengths of greater than 2900 to 3000 angstrom units are cut off by the assembly 4, the radiation beam passes through the chopper disk and the cell 8a to the photomultiplier tube 16.

The absorption characteristics of a sample containing 1 percent by weight of butadiene are indicated by the dashed line 9e, Figure 5, while the absorption characteristics of a sample containing 10.5 percent butadiene are indicated by the dashed dot line 9f, Figure 5. The absorption characteristics of the Vycor section 7b of the chopper disk are indicated by the line 9g. From this figure, it will be evident that changes in butadiene content within the range of 1 to 10.5 percent will not appreciably affect the beam intensity while the Vycor filter is in the path thereof for this filter strongly absorbs the radiation in the same region as does the butadiene. However, when the quartz section 7a of the chopper disk is in the path of the beam, the beam intensity is affected by the butadiene concentration. Thus, by comparison of the intensities of these two portions of the beam, an output is produced which is directly representative of the butadiene concentration in the sample.

From the foregoing discussion, it will be noted that the amount of radiation passing through the instrument is a function of the cut off wavelength of radiation produced by the assembly 4 which, in turn, is critically determined by the size and position of the aperture 6a. In accordance with the invention, the provision of chlorine gas in the cell 5 eliminates this critical dependence of the cut off point upon the width and position of the slit assembly. The absorption characteristics resulting from the use of the chlorine cell are indicated by the line 9h on Figure 5, and it will be noted that the characteristics are such that all radiation longer than about 2800 angstrom units is cut off while substantial transparency is maintained within the wavelength band of interest, i. e., from 2150 to 2600 angstrom units. Accordingly, the cut off wavelength of the focal isolation assembly 4 can be varied without affecting the sensitivity or response of the instrument which, in turn, prevents the necessity for critical adjustment of the size and axial position of the assembly 6. The assembly 4 thus functions to remove all wavelengths above the cut off point (some of which would not be removed by the chlorine gas alone) while the gas eliminates critical dependence of the cut off wavelength upon the aperture size and position.

It will be understood that the described filter system can be advantageously applied to various types of analyzers by properly selecting the characteristics of the filter element, the essential characteristic of the filter material in cell 5 being that it substantially removes the band of wavelengths at and near the cut off point of the focal isolation assembly 4 which is essentially a filter with a sharp cut off point.

Moreover, other types of radiation can be used in the instrument as, for example, visible light or infrared radiation. Where infrared radiation is utilized, the source can be an incandescent filament and the detectors can be bolometers. Further, the position of the chlorine-containing cell or to the similar filtering medium is not critical. For example, the cell 5 can be eliminated and the chlorine gas or other filter medium introduced into the interior of the unit 4a.

Figure 1:
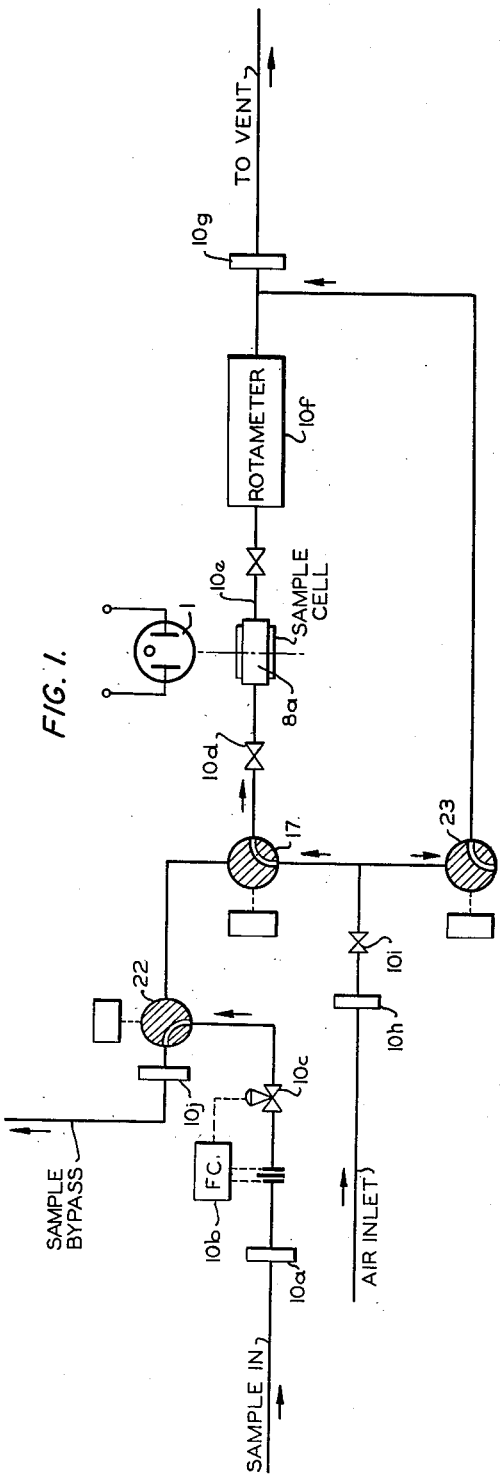
Figure 1 is a schematic view of the fluid-handling system of an analyzer constructed in accordance with the invention.

The manner in which the fluid flow into the cell 8a is controlled is illustrated by Figures 1 and 2.

In Figure 1, it will be noted that the sample passes through a flame arrester 10a, a flow controller 10b, a valve 10c, a three-way solenoid valve 22, a three-way solenoid valve 17 and a valve 10d to the sample cell. Material leaves the sample cell through a valved line 10e, a rotameter 10f and a flame arrester 10g. Thus, with valves 22 and 17 in the proper position, the sample is admitted to the cell, its rate of flow is measured and controlled by the instruments described. This arrangement is provided automatically during the indicating cycles where the test sample is being analyzed in the manner hereafter described.

It will be further noted that air can be admitted to the sample cell through a line including a flame arrester 10h and a valve 10i, the air thence proceeding either to the cell 8a through the valve 17 or through a solenoid valve 23 to the outlet pipe and flame arrester 10g. Further, a sample bypass line provided with a flame arrester 10j is connected to the solenoid valve 22.

During the standardizing cycles, air is passed through the cell 8a as indicated, and valve 22 is operated so as to pass the incoming sample through the sample bypass line and flame arrester 10j. While air is passing through the cell, the instrument automatically standardizes itself, i. e., varies a parameter in the electrical bridge circuit to be hereinafter described so as to compensate for drift resulting from the factors hereinbefore mentioned. During the indicating cycles, the air passes through valve 23 to the outlet pipe and flame arrester 10g. Thus, the described system causes sample fluid to pass through the cell 8a during the indicating cycle, and air to pass through the cell 8a during the standardizing cycle, the sample and standardizing fluids being bypassed during the intervals when they are not passing through the cell.

In some cases, one of the valves is omitted and the system includes one two-way valve regulating the flow of sample either to the cell or the bypass line, and a second two-way valve regulating the flow of air to the cell or bypass line.

Figure 3:
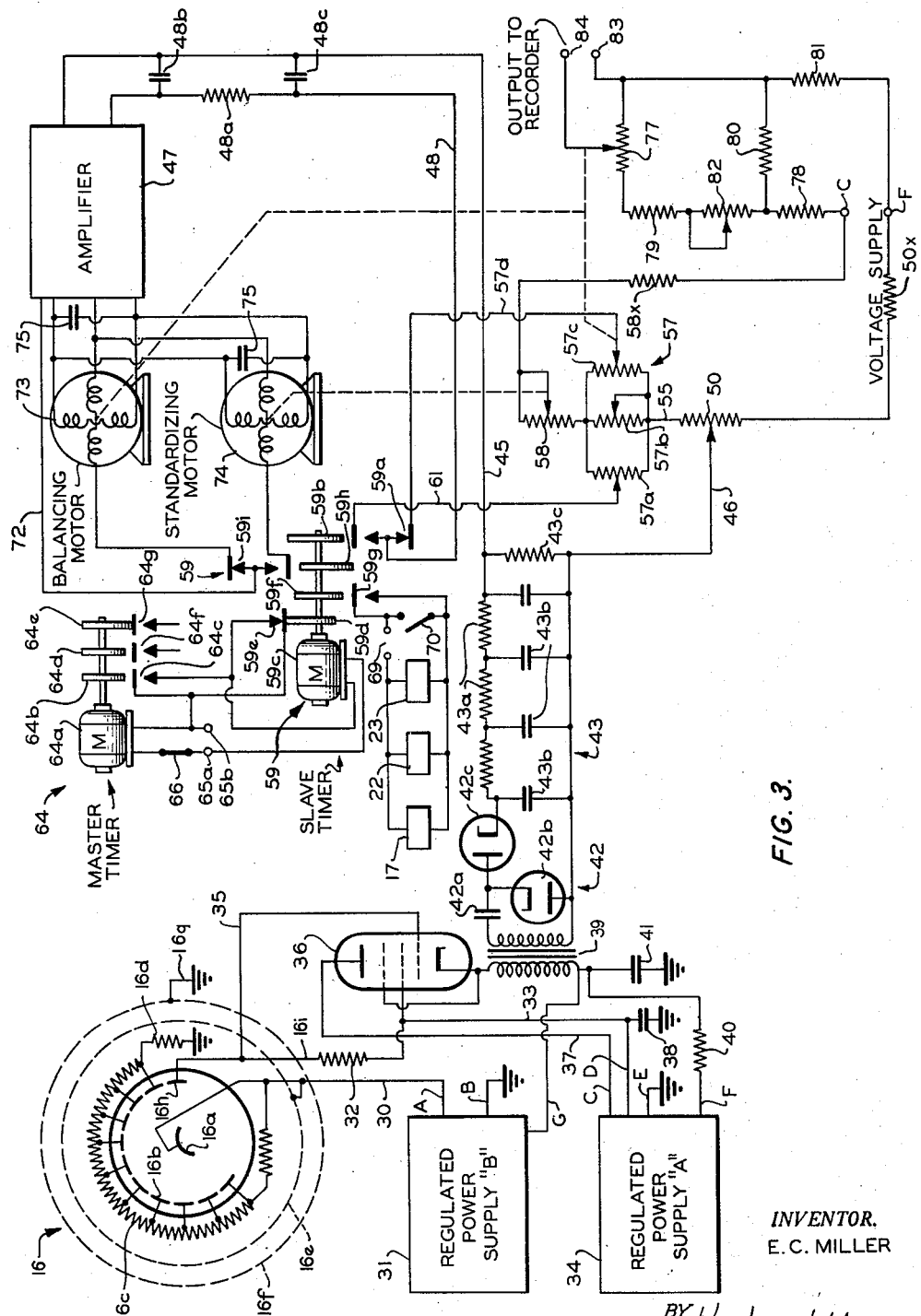
Figure 3 is a schematic circuit diagram of the analyzer of Figure 2.

Referring now to Figure 3, it will be seen that the photomultiplier tube 16 has a cathode 16a which is connected by a lead 30 to a low potential terminal A of a regulated power supply 31. The tube 16 also has a series of anodes 16b which are inter-connected by a network 16c of series resistances, one terminal of the network being connected to lead 30, and the other terminal of the network being grounded through a fixed resistance 16d. The tube 16 is further provided with an inner shield 16e which is connected to lead 30 and an outer shield 16f which is grounded at 16g. Also forming a part of the tube 16 is an anode 16h from which the electrical output is withdrawn. The anode 16h is connected by a lead 16i, a fixed resistance 32 and a lead 33 to a positive terminal D of a regulated power supply 34 which has a grounded low potential terminal E. It will be noted that power supply 31 has a grounded high potential terminal B so that the two power supplies are, in effect, connected in series to provide the requisite power for operating the photomultiplier tube.

The anode 16h is further connected by a lead 35 to the control grid of a cathode follower tube 36. The anode of this tube is connected to a high potential terminal C of power supply 34 by a lead 37, the suppressor grid is connected to the cathode of the tube, and the screen grid is connected by lead 33, which has a grounded bypass condenser 38, to the positive power supply terminal D. The cathode of the tube is connected through the primary winding of a transformer 39 to a power supply terminal G, and through a resistor 40 to a low potential bias terminal F of the power supply 34, the lower end of the primary winding having a grounded bypass condenser 41 connected thereto. It will be understood that the alternating output voltage of the tube 16 is fed through the cathode follower 36 to the primary winding of the transformer 39.

The secondary winding of transformer 39 is connected to a peak detector circuit 42 consisting of a condenser 42a, a rectifier or diode 42b connected in parallel through condenser 42a with the secondary winding of transformer 39, and a series rectifier or diode 42c. The function of this circuit is to efficiently rectify the voltage appearing at the secondary winding of transformer 39, the rectified voltage being passed through a filter 43, consisting of series resistances 43a, parallel condensers 43b, and an output resistor 43c. Consequently, a rectified direct voltage appears between a lead 45 connected to the upper terminal of resistor 43c and a lead 46 connected to the lower terminal of resistor 43c, this rectified voltage having a magnitude proportional to the peak amplitude of the alternating output voltage produced by tube 16.

The lead 45 is connected to one input terminal of an amplifier 47, the other input terminal of which is connected to a lead 48 through a filter consisting of a series resistor 48a and parallel condensers 48b and 48c.

In accordance with the invention, a bucking voltage appears between the leads 46 and 48 which is fed to the amplifier input in series with the rectified voltage appearing across leads 45 and 46. To this end, lead 46 is connected to the contactor of a potentiometer 50, which has one terminal connected through a fixed resistance 50x to the power supply terminal F while the other fixed terminal of potentiometer 50 is connected through a lead 55, a potentiometer unit 57 and a variable resistance 58 and a fixed resistor 58x to the power supply terminal C.

The unit 57 includes three potentiometers 57a, 57b and 57c which are connected in parallel. The contactor of potentiometer 57c is connected by a lead 57d to one fixed contact of a set 59a actuated by a cam 59b of a slave timer 59. The contactor of potentiometer 57a is connected by a lead 61 to the other fixed contact of set 59a. A movable contact cooperates with these fixed contacts and is connected to lead 48 to the end that this amplifier input lead is connected either to the contactor of potentiometer 57a or to the contactor of potentiometer 57c depending upon the position of cam 59b.

Due to the described connection of the resistor network, a standardizing voltage appears between leads 46, 61 while a bucking voltage appears across the leads 46 and 57d, the magnitude of this voltage depending upon the relative positions of the potentiometer contactors and that of the variable resistance 58. One or the other of these voltages, depending upon the position of cam 59b, is applied to the input of the amplifier in series with the rectified output voltage appearing across leads 45, 46. Potentiometer 57b permits a quick convenient adjustment of the direct voltage impressed across the potentiometer units.

The operation of the timer 59 which drives cam 59b is controlled by a master timer 64. This unit has a motor 64a which is connected to one of a set 65a, 65b of power supply terminals through a switch 66 and to the other terminal 65b of this set through a suitable lead. The motor 64a has a shaft which carries a cam 64b controlling a set of contacts 64c. The timer 59 has a motor 59c and a cam 59d which operates a contact set 59e. The motor 59c is connected to the power source 65a, 65b, through the contacts 59e and 64c which are connected in parallel.

During each revolution of cam 64b, there is a momentary closure of contacts 64c which initiates operation of motor 59c and thereby causes cam 59d to close contacts 59e, which remain closed for a full revolution of the shaft of timer 59. Thus, for each revolution of the shaft of timer 64, there is a complete revolution of the shaft of timer 59, the timing being so adjusted that the described actuation of timer 59 occupies only a small part of the cycle of timer 64.

In particular, timer 64 can make one revolution per hour and timer 59 can have a cycle of five minutes. The period during which the timer 59 is operable is referred to hereinafter as the standardization cycle while the remainder of the period of operation of timer 64 is referred to as the indicating cycle. During the indicating cycle, one process stream can be analyzed or, alternatively, timer 64 can operate to successively admit samples of different materials ot be analyzed to the path of the radiation beam so that a multiplicity of streams can be analyzed with a single instrument. To this end, I have shown cams 64*d* and 64*e* associated with contact sets 64*f* and 64*g*, respectively, which are capable of actuating solenoid valves to admit successively a plurality of sample streams to the instrument during the indicating cycle.

However, as shown, only one process stream is analyzed during the indicating cycle and the controls for operating the solenoids of the sample and standard fluid valves are incorporated in timer 59. Specifically, timer 59 has a cam 59*f* which actuates a set of contacts 59*g*, those contacts being connected in series with a current source 69 and the solenoids of valves 17, 22 and 23, all of which are connected in parallel. The cam 59*f* is so shaped as to actuate the solenoids during the standardization cycle, and de-energize them during the indicating cycle. This causes air to be bypassed, and sample material to pass through the cell 8*a* during the indicating cycle, and causes air to pass through the cell 8*a*, and the sample fluid to be bypassed during the standardization cycle, in the manner previously explained in detail. A switch 70 is connected in parallel with contacts 59*g* to permit valve actuation manually and thus provide flow of standard fluid whenever desired, independent of the operation of timer 59.

Timer 59 further operates cam 59*b* to cause the contactor of potentiometer 57*c* to be connected to lead 48 and the amplifier input during the indicating cycle and to cause the contactor of potentiometer 57*a* to be connected to lead 48 and the amplifier input during the standardization cycle, this being effected by the contact set 59*a*.

Timer 59 also includes a cam 59*h* which actuates a set of contacts 59*i*. These contacts selectively connect an amplifier output lead 72 to a balancing motor 73 or a standardization motor 74, the respective coils of the motor, with the exception of those connected to contact set 59*i*, being connected to the amplifier output terminals in well understood fashion. Each of the motors 73, 74 has a condenser 75 connected in parallel with one winding thereof. During the indicating cycle, contacts 59*i* connect balancing motor 73 to the amplifier output and it will be noted that this motor is mechanically connected to the contactor of potentiometer 57*c* and to the contactor of a potentiometer 77.

An adjustable direct potential is applied across the fixed terminals of potentiometer 77 from power supply terminals C and F by a resistance network including fixed resistances 78, 79, 80, and 81 together with a variable resistance 82. One output terminal 83 of the instrument is connected to the junction between resistances 80, 81 and the other output terminal 84 is connected to the contactor of potentiometer 77. In this manner, an output voltage is produced which is indicative of the position of the contactors of potentiometers 57*c* and 77. It will be understood that this output is fed to any suitable recorder or indicating device, and the term indicating device in the appended claims is intended to cover both an indicating instrument and/or a recording instrument.

During the standardization cycle, contacts 59*i* connect the amplifier output to standardizing motor 74, which is mechanically connected to the contactor of variable resistor 58.

In the over-all operation of the system, during the indicating cycle, timer 59 is de-energized so that, referring to Figure 1, air is bypassed and sample material passes through the cell 8*a*. A rectified voltage representative of the concentration of the material under analysis appears between leads 45, 46, and this voltage is fed to the input of amplifier 47 in series with the bucking voltage between lead 46, on the one hand, and leads 48, 57*d* and the contactor of potentiometer 57*c*, on the other hand, it being recalled that contacts 59*a* connect lead 48 to lead 57*d* during the indicating cycle.

Also, balancing motor 73 receives the output of the amplifier, and this motor is mechanically connected, as stated, to the contactors of potentiometers 77 and 57*c*. The action of the motor 73 is to drive the input voltage of the amplifier to zero by moving the contactor of potentiometer 57*c* until the bucking voltage is equal to the output voltage appearing across leads 45 and 46 so that a null condition is obtained. As the composition of the sample changes, the output voltage similarly changes with the result that the contactor of potentiometer 57*c* is moved successively to different positions to maintain the null condition. It follows that the position of the contactor of potentiometer 57*c*, as well as that of the contactor of potentiometer 77, is representative of the amount of the component under analysis present in the sample stream, as is the voltage appearing across terminals 83 and 84.

At the end of the indicating cycle, timer 59 is actuated by timer 64 and passes through a complete cycle of operation. During this standardizing cycle, valves 17, 22, and 23 are actuated by the action of contact set 59*g* to cause air to pass through the cell 8*a*, and the sample stream to be bypassed through the line 10*j*.

Responsive to the action of cam 59*b* and contact set 59*a*, lead 48 is switched from the contactor of potentiometer 57*c* to the contactor of variable resistance 58 and, by the action of contacts 59*i*, the output of amplifier 47 is disconnected from the balancing motor 73 and applied to the standardizing motor 74. As a result, the output appearing across leads 45, 46 is applied to the amplifier in series with the voltage appearing between leads 46 and 61. If no drift has occurred since the next preceding standardization cycle, the standardization voltage appearing between leads 46, 61 is equal to and balances the output voltage at leads 45, 46. Hence, no movement of motor 74 and variable resistance 58 occurs. However, if drift has occurred, the output voltage will be unequal to the standardizing voltage, and motor 74 will move variable resistance 58 until a balanced condition again prevails. This compensates for the error which would otherwise be introduced into the system by drift. It will be noted that this adjustment of variable resistance 58 varies the bucking voltage which will be compared with the output voltage at leads 45, 46 during the next indicating cycle, and thus, in effect, changes the index position of the contactor of potentiometer 57*c* during this next indicating cycle.

At the end of the standardizing cycle, timer 59 stops while the rotation of timer 64 continues to initiate a new (indicating) cycle.

It will be apparent from the foregoing description that the standardization circuit has a number of important advantages. In particular, the current through the network producing the bucking voltage is changed during standardization as well as the magnitude of the bucking voltage itself. This means that a fixed voltage correction is applied at that part of the calibration curve of the instrument where the standardization takes place. However, at points removed from the standardization point on the calibration curve, due to the aforesaid change in current through the network, the correction voltage is either slightly greater or slightly less than the correction voltage applied at the calibration point. Thus, in effect, the correction voltage is "tapered." In practice, this has been found quite advantageous where the composition of the standardizing fluid is different from that of the material being analyzed to a substantial degree, e. g., where the material to be analyzed is butadiene and the standardization material is air. The tapering of the correction voltage in the manner aforesaid results in a better compensation for factors causing drift, and can advantageously be applied where only one cell is interposed in the path of the beam, air or other standardizing material, and butadiene or other material to be analyzed being fed alternately through this cell.

This results in approximate standardization for "zero" and "span" and corresponds to the drift which occurs in the instrument at "zero" and throughout the "span."

Figure 4:
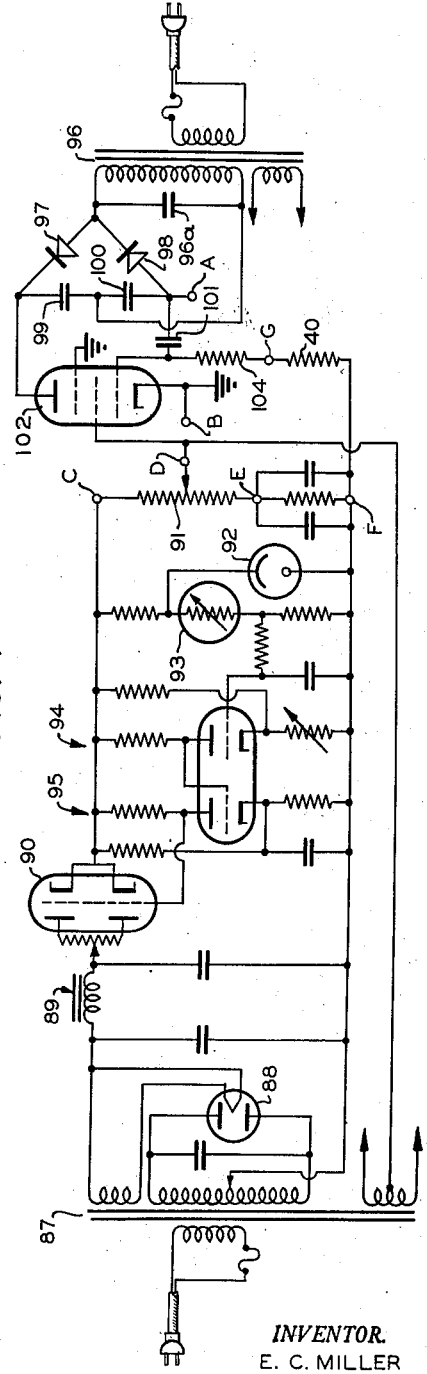
Figure 4 is a schematic circuit diagram of the power supply circuit.

In Figure 4, I have shown a suitable power supply circuit for use with the described instrument. This circuit includes a power transformer 87, dual diode rectifier 88, inductance-capacitance filter 89, and voltage regulator tube 90 which supplies voltage to the terminals C, D, E, and F of a bleeder resistance 91. Regulation of the power supply is obtained through a regulator tube 92 and a temperature compensation device 93, the output of which is fed through two amplifier stages 94 and 95 to the control grid of regulator tube 90, thus producing a constant voltage output across the power supply terminals. Cooperating with the described power supply unit is a second regulated supply which includes a transformer 96, condenser 96a, rectifiers 97 and 98, condensers 99, 100, 101, and a regulator tube 102, the cathode of which is grounded and connected to output terminal B, the other output terminal A being connected to the junction between rectifier 98 and condenser 100. Regulator tube 102 is controlled by a voltage impressed upon its control grid which is connected to condenser 101 and through a fixed resistance 104 and the resistor 40 to power supply terminal F. In this manner, a regulated voltage for tube 16 is obtained, which is advantageous in reducing the amount of drift due to the variations in power supply voltage.

In Figure 7 I have shown a modification of the instrument wherein separate cells are utilized for the sample fluid and standard fluid. In this figure, I have shown a radiation source 110 supplied with an operating voltage from terminals 111 of a regulated power supply, not shown, this source emitting a beam of radiation which passes through a thermostated sample cell 112, a filter 113, chopping mechanism 114 and a thermostated standard cell 115 to a radiation detector 116. In a preferred embodiment of the invention, the source 110 is a hydrogen lamp, which is a source of ultraviolet radiation, and the detector 116 is a photomultiplier tube. In this embodiment, the scanning mechanism includes a rotating disk 114a driven by a motor 114b which is supplied with current from terminals 114c. The disk 114a can consist of a transparent section 114d and a section 114e having the same absorption characteristics as the sample under test, as more fully explained hereinbefore.

When the instrument is designed to analyze the butadiene, the filter 113 is advantageously designed to transmit wavelengths in the region of 1800 to 3000 angstrom units, preferably 2000 to 2800 angstrom units, the section 114b is formed from quartz, and the section 114e is formed from Vycor. The instrument of this invention is also very useful in quantitatively determining the amount of hydrogen sulfide present in a hydrocarbon stream. While, as has been explained, the standardization and indicating system of Figure 2 has particular advantages when utilized with the preferred optical system just described, in its broader aspects, the standardization and indicating circuits are applicable to instruments utilizing various types of radiation, and having various arrangements of the optical system. In particular, the source 110 can be a source of infrared radiation, and the detecting elements can be devices, such as thermocouples or bolometers which are responsive to infrared radiation. Also, source 110 can emit radiation in the visible or other region of the spectrum. Finally, the optical system can utilize a plurality of radiation beams with the standard and sample material interposed in different beams or fed successively to a single cell.

The sample cell 112 is provided with a valved inlet line 112a leading to a three-way solenoid-actuated valve 117 which is selectively connectable with a valved air inlet 118 and a sample line 119. Sample material is fed to the line 119 through a flow controller 120, a pipe 121 and a three-way solenoid-operated valve 122 which connects pipe 121 either with the sample line 119 or a bypass line 122a.

Standard cell 115 has a valved inlet line 115a which is selectively connected by a three-way solenoid-operated valve 123 to the air line 118 and to a valved line 124 for admitting standard material to the instrument. The standard and sample cells are further provided with outlet lines 115b and 112b, respectively, which lead through rotameters 125a and 125b, respectively, to a vent passage or other disposal as desired. Each of the lines 118, 121, 122a and 124 can be provided with a flame arrester 126.

In operation, with source 110 and photomultiplier tube 116 energized and motor 114b operating chopper disk 114a, a sample fluid is fed through line 121, valve 122, line 119 and valve 117 to the sample cell 112 while air is fed to the standard cell 115 through line 118, valve 123 and line 115a. As the disk 114a rotates, transparent sections 114d and 114e are successively and rapidly interposed in the path of the radiation beam. As previously noted, section 114e has the same radiation adsorption characteristics as the material being analyzed and, consequently, produces a signal corresponding to a high percentage, such as 100 percent, concentration of the component of interest in the test stream. When transparent section 114d is interposed in the beam, the magnitude of the signal produced by detector 116 is proportional or representative of the concentration of the selected component in the sample cell. Thus, an output signal of alternating character is produced, the average amplitude of which varies inversely as the concentration of the component of interest in the sample stream, i. e., to the difference between 100 percent and the actual concentration of the selected component. The voltage wave itself, of course, consists of alternate rectangular waves of different heights.

After a period of operation determined by the timing circuits hereinbefore described, valves 117, 122 and 123 are actuated to cause standard fluid to pass through line 124 and valve 123 into the sample cell. At this time, air passes through line 118, valve 117, and line 112a into the sample cell, and the sample is bypassed by flowing through line 121 and valve 122 to the line 122a. Thus, standard material of known composition is introduced into the path of the radiation beam instead of the sample material. This produces an output voltage at detector 116 which, in the absence of drift, would have a fixed predetermined average value. However, if a factor causing drift has occurred during the previous operating cycle, this output signal will vary from its fixed predetermined value. It will be understood that such drift could be caused by variation in supply voltage to the source 110 or detector 116, which factor is minimized by separate power supply circuits, aging of the source 110 or detector 116, fogging of one or more of the windows in cells 112 or 115, and drift resulting from temperature change in the filters 113 or either of the cells. As previously noted, changes in this predetermined voltage are automatically applied in the standardization system to produce a correction compensating therefor to the end that the composition of the sample material is accurately indicated or recorded during the succeeding sample-analyzing cycles.

It will be noted that the standard cell 115 is of considerably shorter length than the sample cell 112. This is a feature of the invention which is particularly advantageous where the standardization fluid has the same composition as the component of interest in the sample. For example, this embodiment is particularly applicable where butadiene is present in a small amount in the sample stream, and pure butadiene is used as the standardization material. In this case, the standard cell is of such a length that when it is filled with the pure material, for example, butadiene, the absorption in the cell is approximately equal to the average absorption by the butadiene in the sample contained in the longer sample cell. This also provides a more efficient standardizing action and contributes to the accuracy and reliability of the analysis. It is to be understood that, in this aspect of the invention, there is comprehended the use of a cell permanently filled with butadiene which can periodically be inserted into or removed from the radiation beam, in lieu of the system shown wherein the standard fluid flows continuously through the standard cell during the standardizing cycle.

While the invention has been described in connection with present, preferred embodiments thereof, it is to be understood that this description is illustrative only and is not intended to limit the invention.

I claim:

1. In an analyzer, in combination, a radiation source, a radiation detector adapted to receive radiation from said source, a sample cell and a standard cell both interposed in the path of radiation passing from said source to said detector, an indicating circuit connected to said detector to produce an output representative of the intensity of radiation incident thereon, a standardization circuit connected to said indicating circuit to vary a parameter thereof, a source ($a$) of standard fluid, a source ($b$) of sample fluid, and a source ($c$) of fluid substantially transparent to said radiation, a first three-way valve selectively connecting said standard cell to source ($a$) and source ($c$), a sample line, a bypass line, a three-way valve selectively connecting source ($b$) to said sample line and said bypass line, a three-way valve selectively connecting said sample cell to said sample line and source ($c$), and a timer operatively connected to said valves and said circuits, said timer being constructed and arranged to alternately (1) energize said indicating circuit, pass sample fluid from source ($b$) to said sample cell, and pass transparent fluid from source ($c$) to said standard cell and (2) energize said standardization circuit, bypass the sample from source ($b$), pass standard fluid from source ($a$) to the standard cell, and pass transparent fluid from source ($c$) through the sample cell.

2. The analyzer of claim 1 wherein the standard fluid has the same composition as the component being analyzed in the sample fluid, the standard cell being relatively short as compared to the sample cell.

3. The analyzer of claim 1 wherein the standard fluid has the same composition as the component being analyzed in the sample fluid, the standard cell being relatively short as compared to the sample cell, said radiation detector being a photomultiplier tube and said radiation source being a hydrogen lamp.

4. In an analyzer, in combination, a radiation source, a radiation detector adapted to receive radiation from said source, a sample cell and a standard cell both interposed in the path of radiation passing from said source to said detector, and means for cyclically passing sample fluid through said sample cell and standard fluid through said standard cell, said standard cell being relatively short compared with said sample cell.

5. In an analyzer, in combination, a radiation source, a radiation detector adapted to receive radiation from said source, a sample cell interposed in the path of radiation passing from said source to said detector, means cyclically operable to pass a sample fluid through said sample cell, and to interrupt the passage of said fluid through said sample cell, and means for interposing standard material in the path of said beam during the intervals when the flow of sample fluid is interrupted, the length of the portion of said standard material thus interposed in the beam being substantially less than the length of said sample cell.

6. An analyzer in accordance with claim 5 in which the radiation source is a hydrogen lamp and the radiation detector is a photomultiplier tube.

7. In an analyzer, in combination, a radiation source, a radiation detector adapted to receive radiation from said source, means for varying the amount of said radiation reaching the detector in response to changes in composition of a material to be analyzed, focusing means in the path of radiation passing from said source to said detector arranged to focus different wavelengths of said beams at different points along a longitudinal axis of said focusing means, an aperture assembly cooperating with said focusing means and arranged to intercept a portion of said radiation of one wave length range and to permit passage of the remainder of said radiation having a different wavelength range, there being a predetermined wavelength by which the said wavelength ranges are defined, and a filter in the path of said radiation arranged to eliminate or substantially attenuate radiation of said cut off wavelength and a portion of the higher and lower adjoining wavelengths whereby the necessity of critical adjustment of said slit assembly to define said wavelength ranges is eliminated.

8. An analyzer in accordance with claim 7 wherein the cut off wavelength is within the range of 2800 to 3200 angstrom units, and said filter is formed from chlorine in the gaseous state.

9. In an ultraviolet analyzer, in combination, a source of ultraviolet radiation, a photomultiplier cell arranged to receive radiation from said source, whereby a beam of radiation passes from said source to said cell, a sample cell in the path of said beam, a focal isolation unit in the path of said beam having an aperture assembly which is adjustable to cut off wavelengths higher than a given value and transmit wavelengths lower than a predetermined value, and a filter in the path of said beam formed of such material to eliminate or substantially attenuate radiation within a wavelength range including said cut off wavelength.

10. In an ultraviolet analyzer, in combination, a source of ultraviolet radiation, a photomultiplier tube arranged to receive a beam of radiation from said source, a sample cell in said beam, focusing means in said beam having a chromatic aberration such that differing wavelengths are focused at different points along a longitudinal axis of said focusing means, an aperture assembly positioned adjacent said focusing means and so positioned relative to said longitudinal axis as to intercept radiation having a wavelength above a predetermined value and to transmit radiation having a wavelength below such predetermined value, a filter cell in the path of said beam, and a filter material in said filter cell of such composition as to eliminate or substantially attenuate radiation within a range of wavelengths including said predetermined value of wavelength.

11. In an ultraviolet analyzer, in combination, a source of ultraviolet radiation, a photomultiplier tube arranged to receive a beam of radiation from said source, a sample cell and a standard cell in the path of said beam, said standard cell being substantially shorter than said sample cell, means for cyclically and rapidly passing a sample fluid through said sample cell and a standard fluid through said standard cell, focusing means in the path of said beam having an aperture assembly which is adjustable to pass radiation having a wavelength lower than a predetermined value and to intercept radiation having a wavelength higher than a predetermined value, and a filter in the path of said beam arranged to eliminate or substantially attenuate radiation having a band of wavelengths including said wavelength of predetermined value.

12. An analyzer in accordance with claim 11 in which said preselected value of wavelength is within the range of 2800 and 3200 angstrom units and said filter is gaseous chlorine.

13. In an analyzer, in combination, a radiation source, a radiation detector arranged to receive a beam of radiation from said source, means for varying the amount of radiation incident upon said detector responsive to changes in composition of a sample material, means in the path of said beam having a cut off wavelength such that the spectrum on one side of said wavelength is attenuated and the spectrum on the other side of said wavelength is unaffected, and a filter in the path of said beam formed from a material which strongly absorbs a band of radiation including radiation of said predetermined wavelength.

References Cited in the file of this patent

UNITED STATES PATENTS

| | | |
|---|---|---|
| 2,265,357 | Demarest | Dec. 9, 1941 |
| 2,452,122 | Gumaer | Oct. 26, 1948 |
| 2,621,298 | Wild et al. | Dec. 9, 1952 |
| 2,694,335 | Albright et al. | Nov. 16, 1954 |